June 10, 1930.  C. W. GARDNER  1,762,776
FURNITURE LEG
Filed Dec. 22, 1927
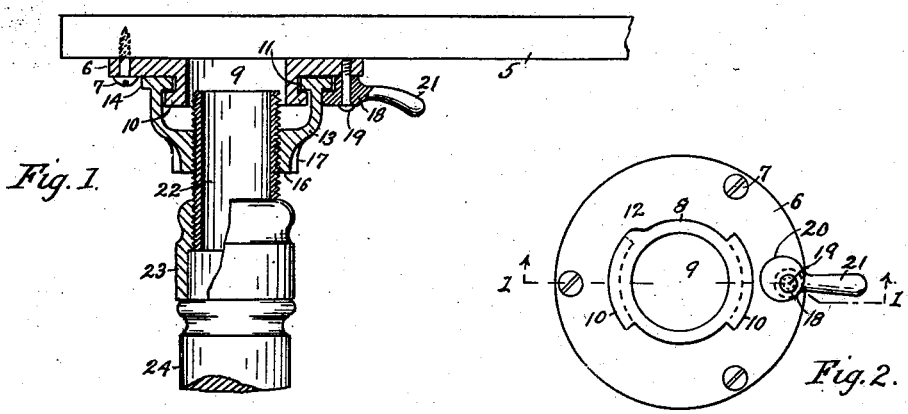
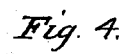
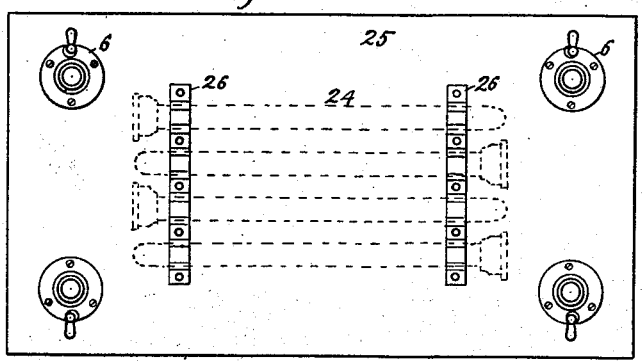
INVENTOR.
Charles W. Gardner
BY
*Wm Bodge* ATTORNEY.

Patented June 10, 1930

1,762,776

UNITED STATES PATENT OFFICE

CHARLES W. GARDNER, OF NEW YORK, N. Y.

FURNITURE LEG

Application filed December 22, 1927. Serial No. 241,900.

The present invention relates to improvements in furniture legs adapted more particularly for the support of tables, stools and similar articles; and one of the objects thereof is to provide detachable legs that may be readily locked in position to the table-top or other article to be supported, and quickly dismounted therefrom and packed in compact relation therewith.

A further object is to provide clamping means for the locking members to prevent displacement of the legs and thus rigidly hold the article to be supported.

And a further object of the invention is to provide a lengthwise adjustment of the legs with respect to the locking members to vary the height of the supported article.

For further comprehension of the invention, and of the objects and advantages thereof, reference is had to the following description and accompanying drawing, and to the appended claims in which the various features of the invention are more particularly pointed out.

Figure 1 is an elevational view embodying my invention, taken partially in section along the broken line 1—1 of Fig. 2, and shown in connection with a table-top.

Figure 2 is a bottom-view of the attachment base adapted to be fixed to the article to be supported.

Figure 3 is a top view of a threaded socket for affording vertical adjustment of the article.

Figure 4 is a bottom view of a table-top showing connections for the legs, with the latter dismounted and packed in relation to the bottom of the table.

In the drawing in which the several reference characters represent corresponding parts throughout the several views, numeral 5 of Fig. 1 indicates a fragmental portion of a table-top, to the bottom of which is fixed the upper flange or attachment base 6 secured in position by the screws 7. The base is provided with a hub 8 having a central perforation 9, and projecting outwardly from the hub is a pair of locking-ledges 10 spaced apart from each other and disposed to provide recesses 11 in connection with the base 6, one of said recesses having a terminal closure or stop 12.

Extending around the hub 8 of the base 6 is a cylindrical socket member 13, having at its upper end an outwardly projecting rim 14, and extending inwardly from the wall of the socket is a pair of ledges 15 spaced apart from each other and arranged to be inserted between the spaced ledges 10 of the base 6 and engage the wall of latter, in which position the socket is turned to effect the entry of the ledges 15 thereof into the recesses 11 formed by the ledges 10 and against the stop 12, the engagement of the opposite pairs of ledges 10 and 15 serving to lock the socket member 13 to the attachment base 6. At its lower end the socket member is provided with a threaded hub 16, and on the exterior surface thereof gripping wings 17 are formed to facilitate the turning movement of the member.

To retain the socket member in locked position, a clamp member 18 is pivotally mounted on the base 6 by the stud 19, and extending inwardly therefrom the clamp member is provided with an off-set eccentric clamp section 20 disposed to engage the wall of the socket member 13 below the rim 14 thereof. Extending outwardly from the clamp member 18 is an operating handle 21 by means of which the eccentric clamp may be operated to detachably hold the socket member against rotation, whereby the latter may be quickly connected to or detached from the attachment base 6.

A lengthwise adjustment of the leg is provided by the screw 22, preferably tubular, the upper end thereof engaging the threaded hub portion 16 of the socket 13, while the lower portion of the screw engages the upper end of a coupling 23, the lower end thereof being fixed in conventional manner to the leg 24 having the desired length and form. As indicated in the drawing, the attachment base 6 is provided with a perforation 9 adapted to receive in clear relation the upper end of the screw 22 to afford greater range of adjustment for the table leg within a given space.

As shown in Fig. 4, four attachment bases are connected to the bottom surface of a table-top 25, and also secured thereto is a double set of spring clips indicated by 26 and adapted to receive the legs when not in use.

I claim:

1. In a furniture leg, an attachment base provided with locking ledges, a socket member having locking ledges co-operating with the ledges of said base, a stop provided for one of said ledges to limit the locking movement of said socket member, a clamp device carried by said base and engaging said socket member, and a leg secured to said socket member.

2. In a furniture leg, an attachment base provided with a central perforation, locking ledges formed on said base, one of said ledges having a terminal stop, a socket member having locking ledges co-operating with the ledges of said base, a clamp device carried by said base and engaging said socket member, a screw threaded in said socket member and movable in clear relation with respect to the prforation in said base, and a leg fixed to the lower end of said screw.

3. In a furniture leg, an attachment base provided with a perforation extending therethrough, a socket member having at its upper end a detachable connection with said base, and at its lower end a threaded hub, a clamp device carried by said base and engaging said socket member to hold the latter against rotation, a leg provided at its upper end with a screw adapted to adjustably engage said threaded hub and pass in clear relation through the perforation in said attachment base.

Signed at New York, in the county of New York and State of New York this 20th day of December A. D. 1927.

CHARLES W. GARDNER.